(12) United States Patent
Gerber et al.

(10) Patent No.: US 8,570,926 B2
(45) Date of Patent: Oct. 29, 2013

(54) METHOD AND APPARATUS FOR INFERRING STATE TRANSITIONS IN A WIRELESS COMMUNICATIONS NETWORK

(75) Inventors: Alexandre Gerber, Madison, NJ (US); Zhuoqing Mao, Ann Arbor, MI (US); Feng Qian, Ann Arbor, MI (US); Subhabrata Sen, New Providence, NJ (US); Oliver Spatscheck, Randolph, NJ (US); Zhaoguang Wang, Ann Arbor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 423 days.

(21) Appl. No.: 12/946,205

(22) Filed: Nov. 15, 2010

(65) Prior Publication Data

US 2012/0120812 A1    May 17, 2012

(51) Int. Cl.
*H04W 52/02* (2009.01)
*H04W 52/22* (2009.01)

(52) U.S. Cl.
USPC ....... 370/311; 370/328; 455/13.4; 455/343.2; 455/422.1; 455/522

(58) Field of Classification Search
USPC ...................... 370/310.2, 311, 328–339, 349; 455/13.4, 127.1, 343.1, 343.2, 343.3, 455/343.4, 343.5, 422.1, 522
See application file for complete search history.

(56) References Cited

U.S. PATENT DOCUMENTS

| | | | |
|---|---|---|---|
| 2002/0045448 A1* | 4/2002 | Park et al. | 455/436 |
| 2010/0048199 A1* | 2/2010 | Forslow | 455/423 |
| 2011/0003557 A1* | 1/2011 | Morita et al. | 455/67.11 |

* cited by examiner

*Primary Examiner* — Hoon J Chung (57) ABSTRACT

A method, a computer readable medium and an apparatus for inferring state transitions in a wireless communications network are disclosed. In one embodiment, the method infers a state promotion procedure. In another embodiment, the method infers a state demotion procedure.

20 Claims, 6 Drawing Sheets

METHOD AND APPARATUS FOR INFERRING STATE TRANSITIONS IN A WIRELESS COMMUNICATIONS NETWORK

The present disclosure relates generally to communication networks and, more particularly, to a method and apparatus for inferring state transitions in a wireless communications network, e.g., a cellular network.

BACKGROUND

As usage of wireless communication networks, e.g., 3G (third generation) cellular networks, continues to grow, a customer's ability to access and utilize the network depends on the availability of capacity. In order to efficiently utilize the limited radio resources, the cellular network is managed using one or more radio network controllers. For example, the Universal Mobile Telecommunications System (UMTS), which is among the most popular 3G networks, allocates radio resources via a radio resource control (RRC) protocol implemented in radio network controllers.

The radio resource allocation to a user endpoint device is determined based on the state of the device. Hence, as the device transitions from one state to another state, the user endpoint device may be allocated a different amount of radio resource.

However, different service providers use different models for the state transition with varied parameters. For example, one service provider may use a model for the state transitions with an inactivity timer shorter than that used by another service provider. The inactivity timer may be used to determine when a radio resource should be released. Hence, an improvement of the state model (state machine design) depends on first knowing the type of state machine being used.

SUMMARY

In one embodiment, the present disclosure describes a method, a computer readable medium and an apparatus for inferring state transitions in a cellular network. In one embodiment, the method sets a radio resource control state for a user endpoint device to a first state, wherein the first state is associated with a first level of a radio resource, and sends a first number of packets from the user endpoint device to a radio network controller, wherein a size of the first number of packets does not trigger a promotion from a second state to a third state, wherein the second state is associated with a second level of the radio resource, wherein the third state is associated with a third level of the radio resource, wherein the second level of the radio resource is larger than the first level of the radio resource and the third level of the radio resource is larger than the second level of the radio resource. The method receives a first set of echoes associated with the first number of packets, and sends a second number of packets from the user endpoint device to the radio network controller, wherein a size of the second number of packets triggers a promotion from the second state to the third state. The method receives a second set of echoes associated with the second number of packets, determines a round trip transmission time for sending the second number of packets and receiving the second set of echoes, and determines if the round trip transmission time is larger than a normal round trip transmission time between the user endpoint device and the radio network controller by a predetermined length of time. The method then infers that the promotion procedure is a promotion from the first state to the second state and then to the third state, if the round trip transmission time is larger than the normal round trip transmission time between the user, endpoint device and the radio network controller by the predetermined length of time, and infers that the promotion procedure is a promotion from the first state to the third state, if the round trip transmission time is not larger than the normal round trip transmission time between the user endpoint device and the radio network controller by the predetermined length of time.

In another embodiment, the method sets a parameter for a number of runs to be performed, and performs a first test and a second test for each of the number of runs to be performed, wherein the first test provides a first round trip transmission time, and the second test provides a second round trip transmission time. The method determines if a difference between the first round trip transmission time and the second round trip transmission time is smaller than a predetermined length of time, and infers that the state demotion procedure is from a third state to a second state, if the difference between the first round trip transmission time and the second round trip transmission time is smaller than the predetermined length of time, and infers that the state demotion procedure is a demotion from the third state to the second state followed by a demotion to a first state, if the difference between the first round trip transmission time and the second round trip transmission time is not smaller than the predetermined length of time.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, a computer readable medium and an apparatus for providing a dynamic inactivity timer in a wireless communications network, e.g., a cellular network. Although the present disclosure is described below in the context of a cellular network, the teaching is not so limited. Namely, the teachings of the current disclosure can be applied for other types of networks, wherein resources are allocated based on states and transitions between states.

Figure 1:
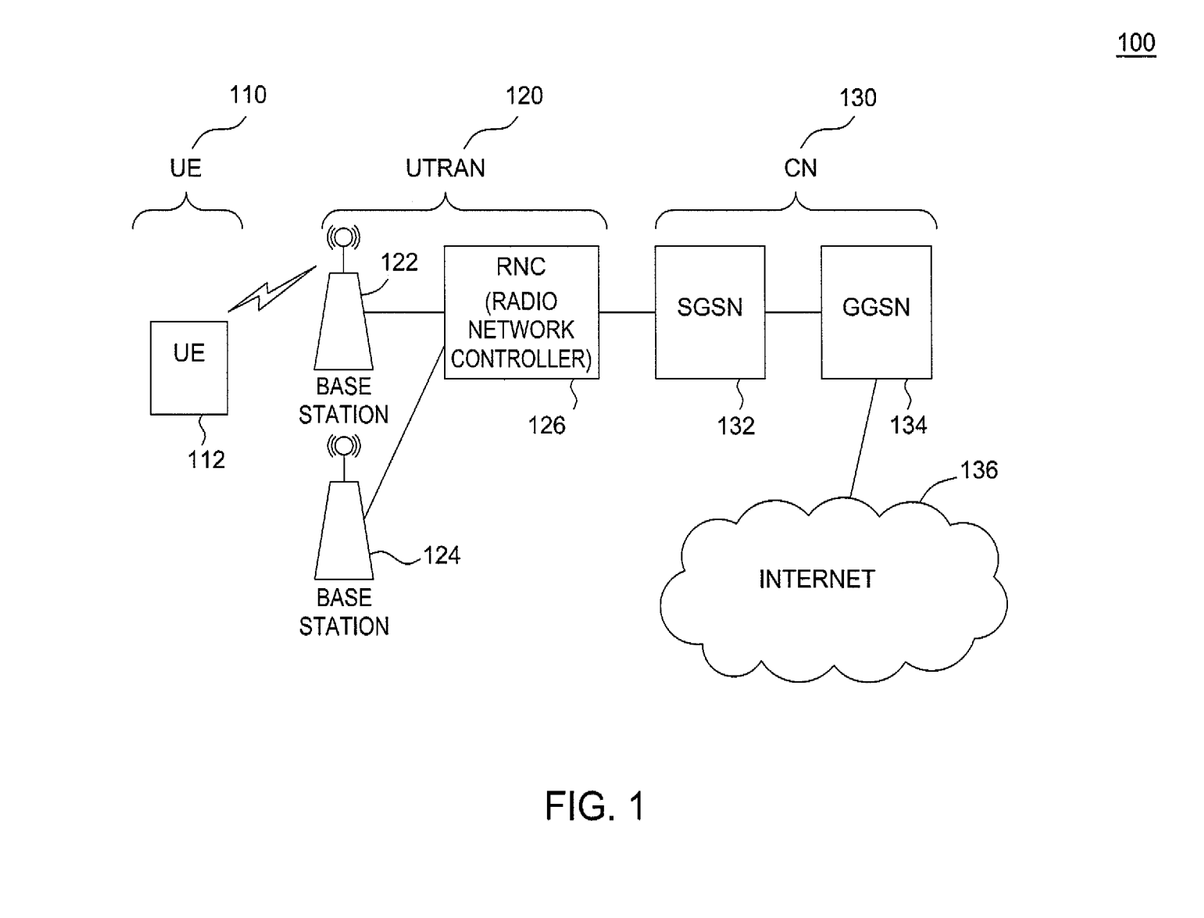
FIG. 1 is a block diagram depicting an illustrative cellular network related to the current disclosure.

FIG. 1 is a block diagram depicting an illustrative cellular network 100 related to the present disclosure. In one embodiment, the cellular network 100 can be a 3G cellular network, e.g., a universal mobile telecommunications system (UMTS) network. However, it should be noted that the cellular network 100 may include other types of cellular networks such as general packet radio services (GPRS) networks, global system for mobile communication (GSM) networks, enhanced data rates for GSM evolution (EDGE) networks, Long Term Evolution (LTE) networks, and so on.

In one embodiment, the network 100 includes three subsystems comprising: a user endpoint (UE) device subsystem 110, a UMTS terrestrial radio access network (UTRAN) subsystem 120 and a core network (CN) 130.

In one embodiment, the UE subsystem 110 includes one or more user endpoint devices 112. The user endpoint devices 112 may include a mobile telephone, a smart phone, a messaging device, a tablet computer, a laptop computer, an air card and the like. The user endpoint devices 112 may communicate wirelessly with the cellular network 100.

In one embodiment, the UTRAN subsystem 120 includes one or more base stations 122 and 124 and a radio network controller (RNC) 126. The UTRAN subsystem 110 provides connectivity between the user endpoint devices 112 and the core network 130. The UTRAN subsystem 120 provides features such as packet scheduling, radio resource control (RRC) and handover control via the RNC 126.

In one embodiment, the core network 130 includes a serving GPRS support node (SGSN) 132, a gateway GPRS support node (GGSN) 134 in communication with the Internet 136. The GGSN 134 serves as a gateway hiding UMTS internal infrastructures from an external network.

The core network 130 serves as the backbone of the cellular network 100. It should be noted that FIG. 1 is a simplified representation of the network 100 and is not intended to illustrate all of the components of the network 100. For example, although two base stations 122 and 124 are illustrated, the network 100 may include any number of base stations and so on. Moreover, the cellular network 100 may also include additional hardware or network components that are not illustrated. In other words, FIG. 1 is an illustration of an exemplary simplified cellular network 100.

In one embodiment, the radio resource allocation to the user endpoint devices is handled via a radio resource control (RRC) functionality implemented in radio network controllers. For the example in FIG. 1, the RRC functionality is implemented in the RNC 126.

In one embodiment, in the context of UMTS, the radio resource refers to three factors that are potential bottlenecks of the network: the frequency spectrum, the WCDMA code space, and the UTRAN transmission power. It is important to note that the radio resource usage, device energy consumption and user experiences are all based on the state of the user endpoint device. To efficiently utilize the limited radio resources, the RRC protocol introduces a state machine associated with each user endpoint device. The allocated radio resource for a user endpoint device is then determined based on its state (RRC state).

In order to more clearly illustrate the teachings of the current disclosure, the RRC states will first be described. RRC states are used to allocate radio resources, with each state being associated with a different amount (or level) of the resource. For example, if there are only two states, one state may be associated with allocating zero resources while the second state may be associated with allocating a maximum resource level. In another example, there may be eleven states with each state associated with zero to 100% of a resource level (e.g., 0%, 10%, 20%, ..., 100%). The RRC states may then be any number of states with each state associated with a resource level. In one embodiment, the resource levels may be assigned according to a service provider's preference.

In one embodiment, the RRC state machine comprises three states used in UMTS cellular networks. The three RRC states are: an IDLE state, a CELL_DCH state and a CELL_FACH state, as described below. It should be noted that the teachings of the current disclosure can be applied in other networks with different RRC state machines. As such, the embodiment as applied and described below for UMTS cellular networks is not intended to limit the scope or applicability of the current disclosure.

In one embodiment, the IDLE state refers to a default state of the user endpoint device when the user endpoint device is turned on. The user endpoint device in the IDLE state has not established an RRC connection with the RNC, thus no radio resource is allocated to the user endpoint device. A user endpoint device in the IDLE state cannot transfer any data. However, it is allowed to send control messages through a shared control channel for initializing an RRC connection. A user endpoint device in the IDLE state consumes little to no energy.

In one embodiment, the CELL_DCH refers to a state wherein the RRC connection with the RNC is established and the user endpoint device is allocated dedicated transport channels in both downlink (RNC to user endpoint device) and uplink (user endpoint device to RNC) directions. The CELL_DCH state allows the user endpoint device to fully utilize the radio resources for user data transmission. The user endpoint device can access the network in HSPA (High Speed Packet Access) mode, if the network infrastructure supports HSPA. CELL_DCH may also be referred to as DCH. A user endpoint device in the CELL_DCH state has the highest amount of energy consumption and the maximum bandwidth.

In one embodiment, CELL_FACH refers to a state wherein the RRC connection is established with the RNC, but there is no dedicated channel allocated to the user endpoint device. Instead, the user endpoint device can only transmit user data through shared low-speed channels (RACH for the uplink and EACH for the downlink). CELL_FACH may also be referred to as FACH. FACH is designed for applications requiring very low data throughput rate. A user endpoint device in CELL_FACH state consumes a lower level of energy and provides a lower level of access, e.g., less than ten Kbps. For example, the energy consumption associated with the CELL_DCH may be 50%-100% higher than that associated with the CELL_FACH state.

It is important to note that the RRC state machine is maintained at both the user endpoint device and the RNC. The two peer entities are always synchronized via control channels except during transient and error situations. Also note that both the downlink and the uplink use the same state machine.

Transitions between the above states (state transitions) are determined by the user endpoint device's data transmission behavior. As such, the user endpoint device may be allocated a different amount of radio resource as the user endpoint device transitions from one state to another state.

In one embodiment, the RRC state machine provides two types of state transitions: state promotions and state demotions.

State promotions include the state transitions: from IDLE state to CELL_FACH state (IDLE→FACH), from IDLE state to CELL_DCH state (IDLE→DCH), and from CELL_FACH state to CELL_DCH state (FACH→DCH). The state transition for a promotion involves switching from a first state with lower radio resource allocation and lower user endpoint device energy consumption to a second state with more radio resource consumption and more user endpoint device energy consumption.

State demotions include the state transitions: from CELL_DCH state to CELL_FACH state (DCH→FACH), from CELL_FACH state to IDLE state (FACH→IDLE), and from CELL_DCH state to IDLE state (DCH→IDLE). The state transition for a demotion involves switching from a first state with higher radio resource allocation and higher user endpoint device energy consumption to a second state with lower (or no) radio resource consumption and lower (or no) user endpoint device energy consumption.

Depending on the starting state, a state promotion is triggered by either any user data (as opposed to control data) transmission activity, if the user endpoint device is at IDLE, or the per-user endpoint device queue size (called RLC (Radio Link Controller) buffer size) exceeding a threshold in either the uplink or downlink direction, if the user endpoint device is at CELL_FACH.

In one embodiment, the state demotions are triggered by two inactivity timers maintained by the RNC. Let, $\alpha$ denote the inactivity timer for the state demotion DCH→FACH and let $\beta$ denote the inactivity timer for the state demotion FACH→IDLE. If the state demotion DCH→IDLE exists, an inactivity timer for the DCH→IDLE may also be defined.

To illustrate the usage of inactivity timers, assume that the inactivity timer $\alpha$ is set to a predetermined fixed threshold, e.g., T seconds, Whenever the RNC observes any uplink or downlink data frame while the RNC is at the CELL_DCH state, the RNC may then reset the inactivity timer. If there is no user data transmission activity for T seconds, the inactivity timer times out and the state of the user endpoint device is demoted to FACH. A similar scheme may be used for the $\beta$ timer and the inactivity timer associated with the demotion DCH→IDLE, if applicable.

Different service providers may use different models for the state transitions described above with varied parameters. In one example, one service provider may allow transitions from the IDLE state to the CELL_DCH state directly, while another server provider allows transition from the IDLE state only to the CELL_FACH state. In another example, one service provider may use a model for the state transitions with one or more of the inactivity timers being shorter than the inactivity timers used by another service provider. The inactivity timers may be used to determine when a radio resource should be reallocated. Hence, an improvement of the state model (the state machine design) depends on knowledge of the type of state machine being used.

In one embodiment, the current disclosure provides a method for determining state transitions by probing the user endpoint devices and using an inference technique. The method determines the type of state machine being used. In order to more clearly illustrate the inference technique, two exemplary RRC state machines will first be described.

Figure 2:
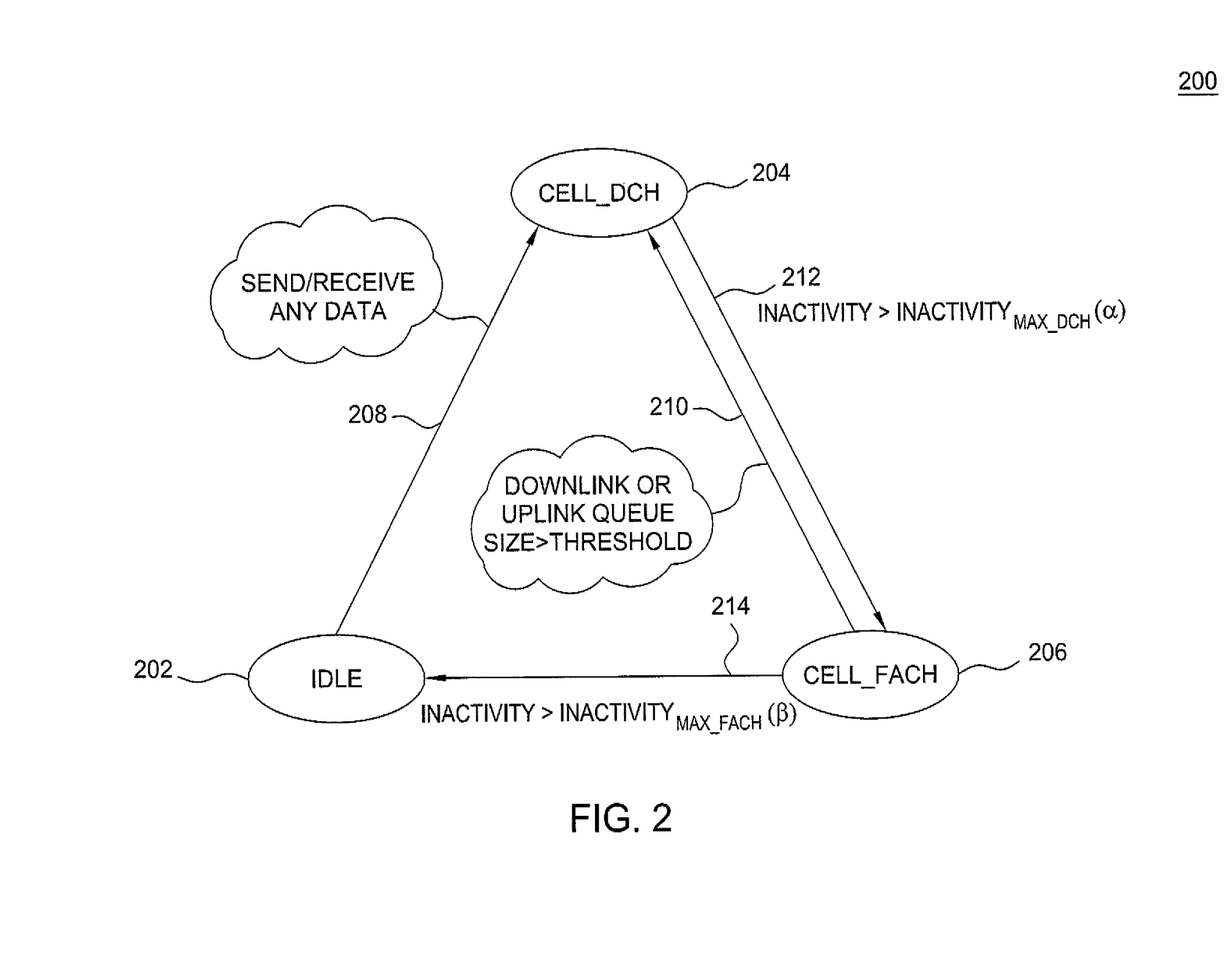
FIG. 2 illustrates a first exemplary RRC state machine implemented in an RNC.

FIG. 2 illustrates a first exemplary RRC state machine 200 implemented in an RNC, e.g., the RNC 126. The RRC state machine 200 comprises three states: an IDLE state 202, a CELL_DCH state 204 and a CELL_FACH state 206, in accordance with the descriptions of the various states described above.

For example, if the RRC state machine is in the IDLE state 202 and any data is sent or received, a promotion may occur to the CELL_DCH state 204. This is illustrated by line 208. Alternatively, if the RRC state machine is in the CELL_FACH state 206 and the downlink or uplink queue size is greater than a predetermined threshold, a promotion may occur to the CELL_DCH state 204. This is illustrated by line 210.

Similarly, for the demotions, if the RRC state machine is in the CELL_DCH state 204 and the amount of inactivity time exceeds a maximum inactivity time a (or $INACTIVITY_{MAX\_DCH}$) then a demotion may occur to the CELL_FACH state 206. This is illustrated by line 212. For example, if $\alpha$ is set to 5 seconds and there is no user data transmission activity for 5 seconds, the RRC state associated with the user endpoint device is demoted from the CELL_DCH state 204 to CELL_FACH state 206. Alternatively, if the RRC state machine is in the CELL_FACH state 206 and the amount of inactivity time exceeds a maximum inactivity time $\beta$, (or $INACTIVITY_{MAX\_FACH}$) then a demotion may occur to the IDLE state 202. This is illustrated by line 214. For example, if $\beta$ is set to 12 seconds and there is no user data transmission activity for 12 seconds, the RRC state associated with the user endpoint device is demoted from the CELL_FACH 206 state to the IDLE state 202.

Figure 3:
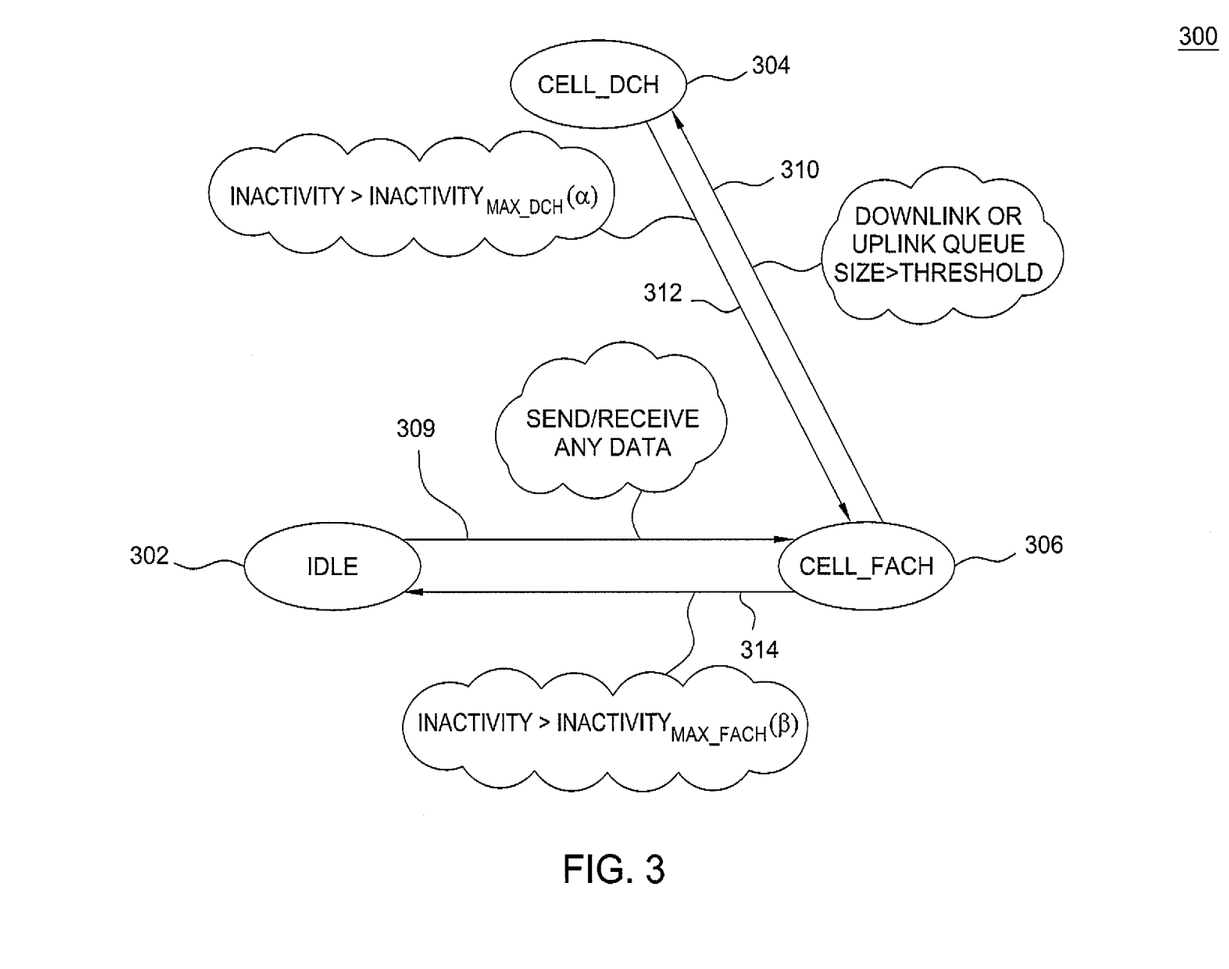
FIG. 3 illustrates a second exemplary RRC state machine implemented in an RNC.

FIG. 3 illustrates a second exemplary RRC state machine 300 implemented in an RNC, e.g., the RNC 126. The RRC state machine 300 comprises three states: an IDLE state 302, a CELL_DCH state 304 and a CELL_FACH state 306, in accordance with the descriptions of the various states described above.

For example, if the RRC state machine is in the IDLE state 302 and any data is sent or received, a promotion may occur to the CELL_FACH state 306. This is illustrated by line 309. Alternatively, if the RRC state machine is in the CELL_FACH state 306 and the downlink or uplink queue size is greater than a predetermined threshold, a promotion may occur to the CELL_DCH state 304. This is illustrated by line 310.

Similarly, for the demotions, if the RRC state machine is in the CELL_DCH state 304 and the amount of inactivity time exceeds a maximum inactivity time a (or $INACTIVITY_{MAX\_DCH}$) then a demotion may occur to the CELL_FACH state 306. This is illustrated by line 312. For example, if $\alpha$ is set to 5 seconds and there is no user data transmission activity for 5 seconds, the RRC state associated with the user endpoint device is demoted from the CELL_DCH state 304 to CELL_FACH state 306. Alternatively, if the RRC state machine is in the CELL_FACH state 306 and the amount of inactivity time exceeds a maximum inactivity time $\beta$, (or $INACTIVITY_{MAX\_FACH}$) then a demotion may occur to the IDLE state 302. This is illustrated by line 314. For example, if $\beta$ is set to 12 seconds and there is no user data transmission activity for 12 seconds, the RRC state associated with the user endpoint device is demoted from the CELL_FACH 306 state to the IDLE state 302.

It should be noted that the RRC state machines 200 and 300 are only exemplary RRC state machines used in a cellular network. The embodiments of the present disclosure may be equally applicable to other variations of RRC state machines.

It should be noted that the CELL_DCH inactivity timer and the CELL_FACH inactivity timer may be set to any time period. The specific inactivity times are provided only as examples and should not be considered limiting.

It should also be noted that state machine promotions and demotions increase the management overhead of the RNC and worsen the user experience. Furthermore, state promotions involve more work (more processing time cycles) than demotions. In particular, state promotions incur ramp-up latency (e.g., two seconds), during which several control messages are exchanged between the user endpoint device and the RNC for resource allocation (e.g., radio bearer reconfiguration and RRC connection setup). Hence, excessive state promotions and demotions increase the management overhead at the RNC and degrade user experience.

One way to reduce the management overhead caused by state machine promotions and demotions is to increase the values of the inactivity timers (e.g., $\alpha$ and $\beta$). However, increasing the values of the inactivity times decreases the radio resource utilization. For example, if the RRC state machine is in the CELL_DCH and there is no user data transmission activity for a time period before the RRC state of the user endpoint device is demoted to the IDLE state, the resource which was allocated to the particular user endpoint device remains unused. This effect on utilization may be referred to as tail effect. The tail may be defined as a time period of a constant duration of an inactivity time before a state demotion. The tail time period can never be used to transfer user data, otherwise the new traffic would have reset the timer and there would not have been a demotion. Hence, in order to optimize resource allocations there is a tradeoff among various considerations that comprise: radio resource utilization, end user experience, management overhead and energy consumption.

As described above, an improvement of the RRC state machine depends on knowledge of the type of state machine being used. The current disclosure provides a method for determining the state transitions by probing the user endpoint devices and using an inference technique, such that the above tradeoffs are based on accurate knowledge of the state transitions. For example, the method may determine a service provider uses an RRC state machine similar to either one of the RRC state machines illustrated in FIG. 2 or FIG. 3.

In one embodiment, the current method provides a first algorithm or method for inferring state promotions and a second algorithm or method for inferring state demotions. For clarity, the assumptions for the algorithms are first provided:

(i) There are at most three states: IDLE, CELL_FACH, and CELL_DCH, and the CELL_DCH state is the state allowing high data rate transfers;

(ii) The time granularity for inactivity timers is measured in seconds. If the inactivity timers have a finer granularity, a more accurate probing scheme may be used;

(iii) The state promotion delay is significantly longer than a normal round trip transmission delay for both the CELL_DCH and the CELL_FACH states; and (iv) The range of the RLC (Radio Link Controller) buffer thresholds is (64 B-3 KB) for triggering the FACH→DCH promotion.

In one embodiment, the first algorithm for inferring state promotions determines which one of the two promotion procedures used by UMTS cellular networks is implemented in the RRC state machine. The two promotion procedures used for UMTS cellular networks are: P1: IDLE→FACH→DCH and P2: IDLE→DCH. Using the promotion procedure P1: IDLE→FACH→DCH implies that if the RRC state machine is in the IDLE state and any data is received or sent, the RRC state associated with the user endpoint device is promoted to the CELL_FACH state. A further promotion to the CELL_DCH state occurs if and when the buffer threshold is reached in accordance with (iv) above. Using the promotion procedure P2: IDLE→DCH implies that if the RRC state machine is in the IDLE state and any data is received or sent, the RRC state associated with the user endpoint device is promoted to the CELL_DCH state directly (without transitioning to the CELL_FACH state).

In one embodiment, the first algorithm distinguishes between P1 and P2. In order to distinguish between P1 and P2, the method needs to know when a promotion procedure includes the CELL_FACH state. That is, one promotion procedure (P2) simply transits from IDLE to CELL_DCH regardless of the number of packets being sent by the user endpoint device. The second promotion procedure (P1) transits from IDLE to FACH if the user endpoint device sends a small number of packets, and then proceeds to the CELL_DCH state only if the buffer size exceeds a specific threshold. Hence, distinguishing between the two types of promotion procedures may be performed by sending packets of increasing sizes.

For example, a small number of packets (e.g., overhead only) followed by a large number of packets (e.g., overhead with large content) may be sent. If the time to receive a response from the server shows no difference as the change is made to start sending a large number of packets after having sent a small number of packets, the method may then infer that the promotion procedure is P2. That is, the maximum amount of resource was already allocated when a small number of packets were being sent. As such, there is no additional promotion delay to detect.

In contrast, if the time to receive a response from the server shows a large difference (e.g., 500 ms to an order of 2 seconds) as the change is made to start sending a large number of packets after having sent a small number of packets, the method may then infer that the promotion procedure is P1. That is, the amount of resource allocated when the small number of packets was being sent is no longer adequate and the buffer threshold is being reached. Hence, the server makes a further promotion of the state for endpoint device such that more resources are allocated to the endpoint device. The additional time is detected as the promotion is occurring from the FACH state to the DCH state.

In the description above, the user endpoint device sends a large number of packets after sending a small number of packets. The relative terms "small" and "large" are used to signify a number of packets that do not trigger a promotion from FACH to DCH and a number of packets that do trigger a promotion from FACH to DCH, respectively. As such, the actual number of packets may vary. For convenience, the current method denotes the RLC buffer size that does not trigger the FACH→DCH promotion by min. The method also denotes the RLC buffer size that triggers the FACH→DCH promotion by max.

In one embodiment, min is illustratively set to 28 bytes (which is a size that corresponds to an empty UDP packet plus an Internet protocol header) and max is illustratively set to 3K bytes.

Note that the IDLE→DCH or IDLE→FACH promotion always occurs regardless of RLC buffer size. That is, if the state of the endpoint device is the IDLE state and the device starts transmitting user data, a promotion occurs. The promotion is to one of the FACH or DCH states. The algorithm is used in order to detect the presence of an additional promotion.

In one embodiment, the method is implemented in a user endpoint device which utilizes one of the UMTS promotion procedures. The method first sets (or resets) the RRC state machine for a user endpoint device to the IDLE state. The method then sends min bytes from the user endpoint device to the RNC. The RNC then sends a response to the endpoint device. The response is referred to as an echo. That is, the RNC echoes min bytes.

In one embodiment, the method then sends max bytes from the user endpoint device to the RNC. The RNC then echoes min bytes. The method also records the round trip transmission time for sending the max bytes and receiving the associated echo from the RNC.

In one embodiment, the method then determines if the round trip transmission time recorded above is much larger than normal round trip transmission time. For example, the normal round trip transmission time may be less than 500 ms while the round trip transmission time for sending the max bytes and receiving the associated echo from the RNC may be 2.5 seconds. That is, the method determines if the round trip transmission time recorded for sending the max bytes and receiving the associated echo from the RNC includes an additional promotion delay. For the example above, the recorded time includes a promotion delay of two seconds.

In one embodiment, if the round trip transmission time recorded above is much larger than normal round trip transmission time, the method infers that the promotion procedure P1: IDLE→FACH→DCH is used.

Table 1 provides an exemplary first algorithm for inferring state promotion. P1 is inferred if the state is promoted to FACH at Step 2 and then further promoted to DCH at Step 3. That is, P1 is inferred if Δt includes the additional FACH→DCH promotion delay. Otherwise, the method infers that the promotion procedure P2: IDLE→DCH is used. That is, P2 is inferred if Δt does not include the additional promotion delay since the state is already at DCH after Step 2.

TABLE 1

Exemplary Algorithm for Inferring State Promotion.
Algorithm for State Promotion Inference 1: Keep user endpoint (UE) on IDLE
2: UE sends min bytes. Server echoes min bytes
3: UE sends max bytes. Server echoes min bytes.
4: UE records the RTT Δt for Step 3.
5: Report P1 iff Δt >> normal RTT. Otherwise, report P2.

The second algorithm is used for inferring state demotions. The second algorithm determines which one of the two demotion procedures used by UMTS cellular networks is implemented in the RRC state machine. The two demotion procedures used for UMTS cellular networks are: D1: DCH→FACH and D2: DCH→FACH→IDLE. Table 2 provides the algorithm used for inferring which demotion procedure is used. The second algorithm identifies the demotion procedure by performing two types of tests: a first test and a second test. Both tests are performed for a predetermined number of runs denoted by n. For example, if the tests are to be performed every second for 30 seconds, n is set to 30.

For each run of the first test (i.e., for n=0, . . . 30) the user endpoint device performs the following:

(i) The user endpoint device sends max bytes to the server in order to have its RRC state be the CELL_DCH state. The server echoes min bytes.
(ii) The user endpoint device sleeps for n seconds.
(iii) The user endpoint device sends min bytes. The server echoes min bytes.
(iv) The user endpoint device records the round trip transmission time associated with sending the min bytes and receiving the corresponding echo. The round trip transmission times for the first test are denoted by $\Delta t_1 (0 \ldots 30)$.

In each run of the first test, the user endpoint device enters the CELL_DCH state by sending max bytes, sleeps for n seconds, and then sends min bytes. By increasing n from 0 seconds to 30 seconds, all the states experienced by the user endpoint device due to the inactivity timers are exercised.

The method then performs the second test for n runs. (e.g., for n=0, . . . 30). For each run of the second test the user endpoint device performs the following:

(i) The user endpoint device sends max bytes to the server in order to have its RRC state be the CELL_DCH state. The server echoes min bytes.
(ii) The user endpoint device sleeps for n seconds.
(iii) The user endpoint device sends max bytes. The server echoes min bytes.
(iv) The user endpoint device records the round trip transmission time associated with sending the max bytes in (iii) and receiving the corresponding echo for the max bytes in (iii). The round trip transmission times for the second test are denoted by $\Delta t_2 (0 \ldots 30)$.

The second test is similar to the first test, except that after step (iii) of the second test, the user endpoint device is in the DCH state. In contrast, after step (iii) of the first test, if the demotion from DCH→FACH exists, the user endpoint device is in the FACH state.

The method then compares for each n, $\Delta t_1 (0 \ldots 30)$ and $\Delta t_2 (0 \ldots 30)$. If the $\Delta t_1 (0 \ldots 30)$ and $\Delta t_2 (0 \ldots 30)$ are similar, the method infers that the demotion procedure is D1. If the $\Delta t_1 (0 \ldots 30)$ and $\Delta t_2 (0 \ldots 30)$ are not similar, the method infers that the demotion procedure is D2. That is, $\Delta t_1 (0 \ldots 30)$ and $\Delta t_2 (0 \ldots 30)$ are not similar because the state is demoted to FACH (the α timer), then back to IDLE (the β timer). For convenience $\Delta t_1 (\bullet)$ and $\Delta t_2 ( )$ are use to denote $\Delta t_1 (0 \ldots 30)$ and $\Delta t_2 (0 \ldots 30)$, respectively.

TABLE 2

Exemplary Algorithm for Inferring State Demotion.
Algorithm for State Demotion Inference 1: for n = 0 to 30 do
2:    UE (user endpoint) sends max bytes. Server echoes min bytes.
3:    UE sleeps for n sec.
4:    UE sends min bytes. Server echoes min bytes.
5:    UE records the RTT $\Delta t_1(i)$ for step 4.
6: end for
7: for n = 0 to 30 do
8:    UE sends max bytes. Server echoes min bytes.
9:    UE sleeps for n sec.
10:   UE sends max bytes. Server echoes min bytes.
11:   UE records the RTT $\Delta t_2(i)$ for step 10.
12: end for
13: Report D1 iff $\Delta t_1(\bullet)$ and $\Delta t_2(\bullet)$ are similar. Otherwise, report D2

In one embodiment, once the state promotions and demotions are inferred, the method infers other parameters. For example, the inactivity timers may be directly obtained from the $\Delta t_1 (\bullet)$ and $\Delta t_2 (\bullet)$ computed by the algorithm for state demotions. Firstly, for the case where the demotion is DCH→FACH→IDLE, one can deduce α and β from the fact that $\Delta t_1 (0 \ldots \lfloor \alpha+\beta \rfloor)$ are smaller than $\Delta t_1(\lceil \alpha+\beta \rceil \ldots 30)$, and $\Delta t_2 (0 \ldots \lfloor \alpha \rfloor)$ are smaller than $\Delta t_2(\lceil \alpha \rceil \ldots 30)$. This is because in the first test of the algorithm used for inferring demotions, the state promotion IDLE→FACH does not happen until $n \geq \lceil \alpha+\beta \rceil$. In the second test, the state promotion (FACH→DCH or IDLE→DCH) happens when $n \geq \lceil \alpha \rceil$. Similarly, for the case where the demotion is DCH→IDLE, let the only inactivity timer be γ. Then, $\Delta t_1 (0 \ldots \lfloor \gamma \rfloor)$ are much smaller than $\Delta t_1(\lceil \gamma \rceil \ldots 30)$. Then, to infer the promotion delay X→Y, the round trip time (RTT) including the promotion is measured. Then, the normal RTT (i.e., not including the promotion) is subtracted from the result.

In one embodiment, the current method determines the FACH→DCH promotion delay from the $\Delta t_1 (0 \ldots 30)$ and $\Delta t_2 (0 \ldots 30)$ using: $\lfloor \alpha \rfloor < i \leq \lfloor \alpha+\beta \rfloor$.

In one embodiment, the current method also infers the RLC buffer thresholds by performing binary search for the packet size that exactly triggers the FACH→DCH promotion, on each direction. For example, the method may send packets of increasing size until the FACH→DCH promotion is triggered. The method then identifies the packet size that first triggers the FACH→DCH promotion as the RLC buffer threshold.

In order to further illustrate the above method, the state machine inference algorithms described above are used to infer the state promotions and state demotions for two exemplary service providers (carriers). Each service provider uses one of the UMTS promotion and demotion procedures.

For each carrier, the algorithms in Tables 1 and 2 are run three times, ensuring that in each experiment:
 (i) the server does not experience a timeout;
 (ii) no other user data transmission that may trigger other state transitions is observed; and
 (iii) the 3G connection is never dropped.

If any of the above conditions are violated, the result is discarded and the procedure is repeated. Assume then the following results are observed:
 (i) the normal RTTs for Carriers 1 and 2 are less than 0.3 s; and
 (ii) the measured $\Delta t$ values for the promotion algorithm for carriers 1 and 2 are (0.2 s, 0.2 s, 0.2 s) and (1.5 s, 1.5 s, 1.5 s), respectively, for the three trials.

Based on the promotion algorithm, the method then infers the promotion procedures for Carrier 1 and Carrier 2 as being IDLE→DCH and IDLE→FACH→DCH, respectively.

Then, the algorithm used for inferring demotions is run. Suppose, a significant time difference is observed for Carrier 1 between $\Delta t_1$ (5 . . . 16) and $\Delta t_2$ (5 . . . 16). The result then indicates that the state demotion procedure is DCH→FACH→IDLE. Similarly, suppose a significant disparity exists between $\Delta t_1$ (6 . . . 9) and $\Delta t_2$ (6 . . . 9) for Carrier 2. The result then indicates that Carrier 2 also uses DCH→FACH→IDLE.

Furthermore, suppose that for Carrier 1, $\Delta t_1$ (17 . . . 30) and $\Delta t_2$ (17 . . . 30) are roughly the same for the demotion algorithm. That means, either sending min bytes or sending max bytes triggers an IDLE→DCH promotion, implying that it is the only promotion transition for Carrier 1.

In contrast, suppose that for Carrier 2, $\Delta t_1$ (10 . . . 30) is much smaller than $\Delta t_2$(10 . . . 30) for the demotion algorithm. Therefore, sending min bytes and sending max bytes in triggering IDLE→FACH and IDLE→DCH, respectively, will result in different promotion delays. That means, Carrier 2 may perform two types of promotions depending on the RLC buffer size.

The above inferences for Carriers 1 and 2 indicate that Carrier 1 uses an RRC state machine similar to the RRC state machine 200 of FIG. 2, and Carrier 2 uses an RRC state machine similar to the RRC state machine 300 of FIG. 3.

Given the $\Delta t_1$ (•) and $\Delta t_2$(•) values provided above for the demotion algorithm, $\alpha$ and $\beta$ may also be inferred. The inference results are $(\alpha,\beta)$=(5 s,12 s) for Carrier 1 and $(\alpha,\beta)$=(6 s,4 s) for Carrier 2. To infer the RLC buffer thresholds triggering FACH→DCH, the experiments may be repeated several times, e.g., 30 times.

As described above, the radio energy consumption of the user endpoint device depends on the RRC state of the device. The current method may then use the variability of the energy consumption to validate the results of the inference techniques.

For example, in order to confirm the inactivity timers and state promotion delays, the battery of the UE (e.g., a smartphone) may be attached to a power meter. The power meter may then be connected to a computer such that the output power of the battery may be recorded.

In one example, after keeping the smartphone in an inactive state for a time period (e.g., 20 seconds), the method may send a UDP packet. Assuming the IDLE→DCH promotion takes approximately 2 sec, the packet is sent at about t=23.8 sec. From t=26.1 sec, the phone remains at the high-power DCH state for about 5 sec, then switches to the low-power FACH state at t=31.5 sec. Finally at t=44.1 sec, the phone returns to the IDLE state. Similar, the FACH→DCH promotion delay for carrier 2's state machine may be validated.

By computing the average power using the IDLE power as the baseline, the method may then derive the energy consumption values. Similarly, the method may use the energy as an indicator to search for the buffer threshold that exactly triggers the promotion.

It is important to note that, during probing, all other major system components that may affect power consumption at the same power state are disabled to eliminate their effect whenever possible. For example, by closing all applications and network activities, keeping the screen brightness at the same level, turning off global positioning systems (GPS) and WiFi, etc., the effect of other components may be reduced.

The above results for Carriers 1 and 2 are summarized in Table 3. The inferences indicate that Carrier 1 uses an RRC state machine similar to the RRC state machine 200 and Carrier 2 uses an RRC state machine similar to the RRC state machine 300. The carriers have inactivity timers and RLC buffer thresholds (thresholds triggering FACH→DCH) set to different values. Note also that their state transitions from IDLE state are different. Hence, the carriers may need different optimal state machine configurations to better balance radio resource utilization and performance.

TABLE 3

Exemplary inferred parameters for Carriers 1 and 2.

|  | Carrier 1 | Carrier 2 |
|---|---|---|
| Inactivity timer |  |  |
| α: DCH→FACH | 5 sec | 6 sec |
| β: FACH→IDLE | 12 sec | 4 sec |
| Promotion Time |  |  |
| IDLE→FACH | N/A | 0.6 sec |
| IDLE→DCH | 2 sec | N/A |
| FACH→DCH | 1.5 sec | 1.3 sec |
| RLC Buffer threshold |  |  |
| FACH→DCH (UL) | 543 ± 25 B | 151 ± 14 B |
| FACH→DCH (DL) | 475 ± 23 B | 119 ± 17 B |
| State Radio Power |  |  |
| DCH | 800 mW | 600 mW |
| FACH | 460 mW | 400 mW |
| IDLE | 0 | 0 |
| Promotion Radio Power |  |  |
| IDLE→FACH | N/A | 410 mW |
| IDLE→DCH | 550 mW | N/A |
| FACH→DCH | 700 mW | 480 mW |

Figure 4:
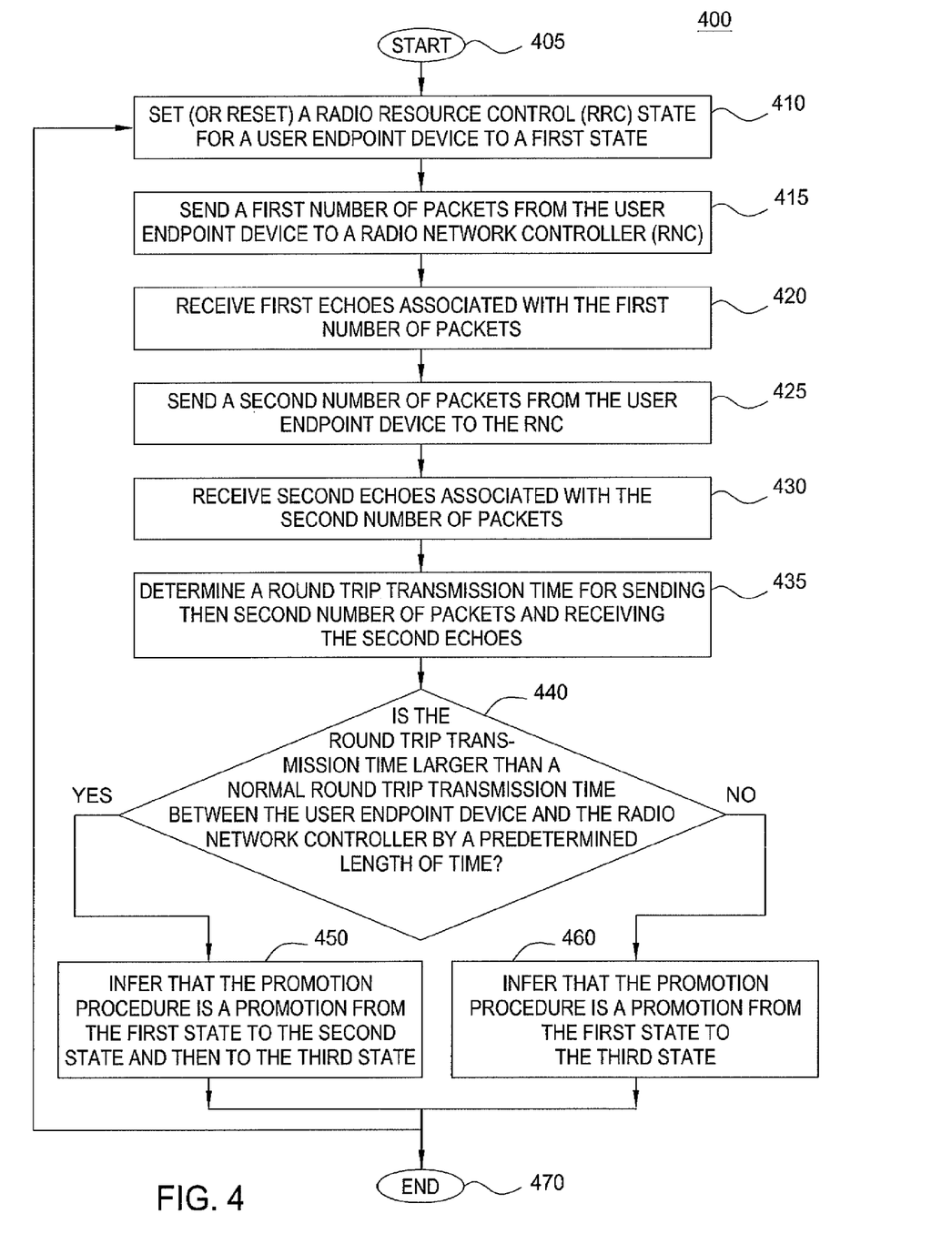
FIG. 4 illustrates a flowchart of a method for inferring a state promotion procedure of a radio resource controller state machine.

FIG. 4 illustrates a flowchart of a method 400 for inferring a state promotion procedure of a radio resource controller state machine. In one embodiment, the method 400 can be implemented in a radio network controller (RNC), a user endpoint device, or a general purpose computer having a processor, a memory and input/output devices as discussed below in reference to FIG. 6. The method 400 starts in step 405 and proceeds to step 410.

In step 410, method 400 sets (or resets) a radio resource control (RRC) state for a user endpoint device to a first state, wherein the first state is associated with a first level of a radio resource. For example, the first state may be a state in which no radio resource is allocated to the user endpoint device.

In one embodiment, the first state is an IDLE state, wherein the IDLE state is a default state of the user endpoint device when the user endpoint device is turned on but the user endpoint device has not established a radio resource control connection with the radio network controller.

In step 415, method 400 sends a first number of packets from the user endpoint device to a radio network controller (RNC), wherein the size of the first number of packets does not trigger a promotion from a second state to a third state, wherein the second state is associated with a second level of the radio resource, wherein the third state is associated with a third level of the radio resource, wherein the second level of the radio resource is larger than the first level of the radio resource and the third level of the radio resource is larger than the second level of the radio resource.

In one embodiment, the first number of packets is min bytes. In one embodiment, the second state is the CELL_FACH state and the third state is the CELL_DCH state. The min bytes then do not trigger a promotion from a CELL_FACH state to a CELL_DCH state, even if the promotion from FACH to DCH exists in the state machine.

In step 420, method 400 receives a first set of echoes associated with the first number of packets. For example, the method receives from the radio network controller echoes for the min bytes sent in step 415. For example, after the radio network controller receives the min bytes, the radio controller sends min bytes to the user endpoint device.

In step 425, method 400 sends a second number of packets from the user endpoint device to the RNC, wherein the size of the second number of packets triggers a promotion from the second state to the third state.

In one embodiment, the second number of packets is max bytes. The max bytes then trigger a promotion from a CELL_FACH state to a CELL_DCH state, if the FACH to DCH promotion exists in the state machine.

In step 430, method 400 receives a second set of echoes associated with the second number of packets. For example, after the radio network controller receives the max bytes sent in step 425, it responds to the user endpoint device with max bytes.

In step 435, method 400 determines a round trip transmission time for sending the second number of packets and receiving the second set of echoes. For example, the method determines the round trip transmission time for sending max bytes and receiving echoes associated with the max bytes.

In step 440, method 400 determines if the round trip transmission time is larger than a normal round trip transmission time between the user endpoint device and the radio network controller by a predetermined length of time. Generally, a normal round trip transmission time includes at least one promotion, since the method is starting from IDLE. However, if an additional promotion delay is included (e.g., a second promotion in addition to the first promotion), the round trip transmission time determined above may be on the order of seconds larger than the normal round trip transmission time. For example, the round trip transmission time may be larger than the normal round trip transmission time by 500 ms, 1 sec, 2 sec, etc. If the round trip transmission time is much larger than a normal round trip transmission time (i.e., for a single promotion), the method proceeds to step 450. Otherwise, the method proceeds to step 460. In one embodiment, the predetermined length of time is at least 500 ms.

In step 450, method 400 infers that the promotion procedure is a promotion from the first state to the second state and then to the third state. For example, the promotion procedure may be from the IDLE state to the CELL_FACH state and then to the CELL_DCH state, as described above. That is, the promotion procedure P1: IDLE→FACH→DCH is used. The method then either proceeds to step 470 to end processing the current inference or to step 410.

In step 460, method 400 infers that the promotion procedure is a promotion from the first state to the third state. For example, the promotion procedure may be from the IDLE state to the CELL_DCH state. That is, the method infers that the promotion procedure P2: IDLE→DCH is used. The method then either proceeds to step 470 to end processing the current inference or to step 410.

Figure 5:
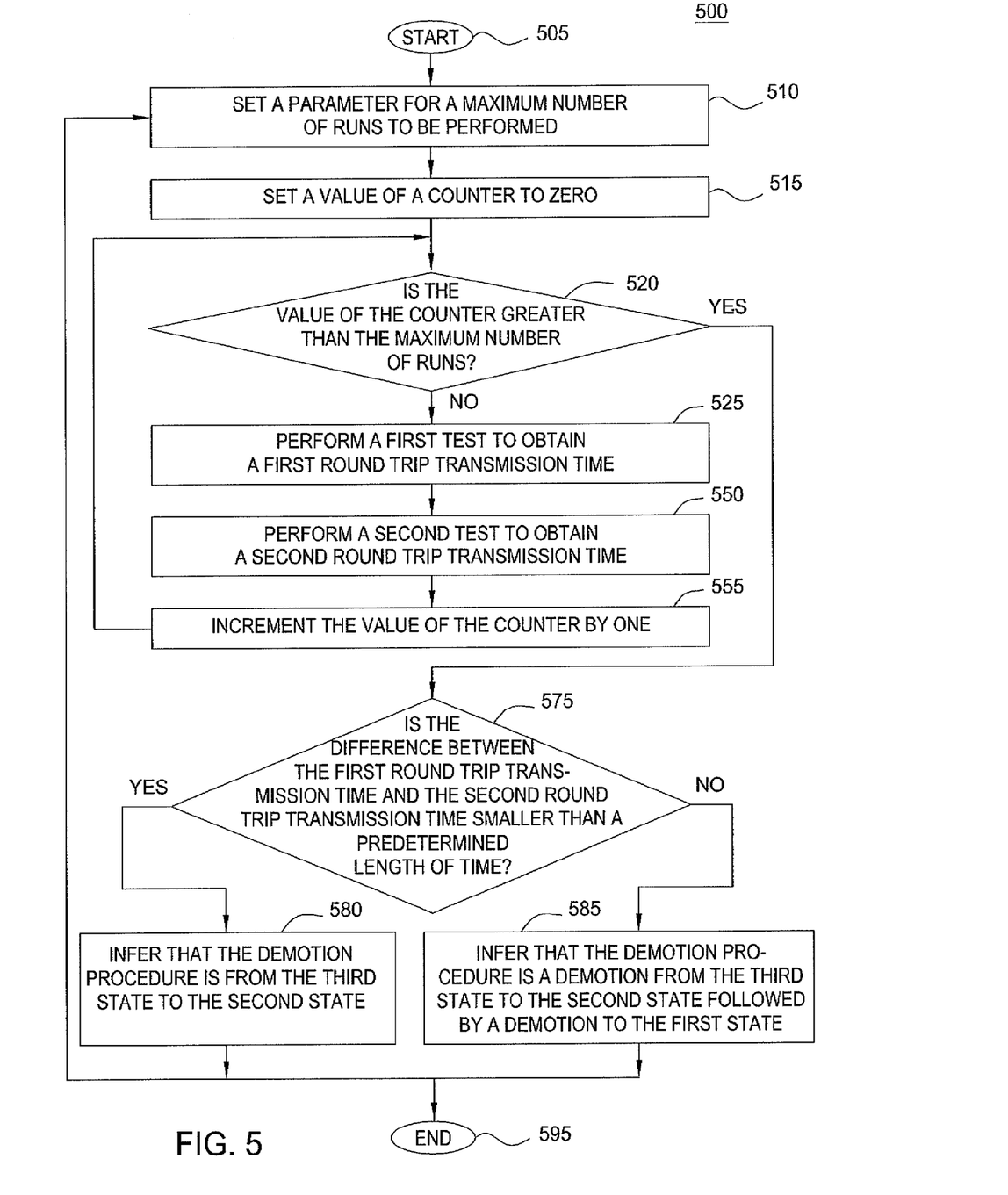
FIG. 5 illustrates a flowchart of a method for inferring a state demotion procedure of a radio resource controller state machine.

FIG. 5 illustrates a flowchart of a method 500 for inferring a state demotion procedure of a radio resource controller state machine. In one embodiment, the method 500 can be implemented in a radio network controller (RNC), a user endpoint device, or a general purpose computer having a processor, a memory and input/output devices as discussed below in reference to FIG. 6. The method 500 starts in step 505 and proceeds to step 510.

In step 510, method 500 sets a parameter for a maximum number of runs to be performed. For example, if the inferring is based on running the inference algorithm every second for 30 seconds, the method sets the maximum number of runs to 30. It should be noted that the value of the maximum number of runs to be performed can be dynamically selected.

In step 515, sets a value of a counter to zero. For example, the method sets the counter such that it can be used to count the run number from 0 to 30, etc.

In step 520, method 500 determines if the value of the counter is greater than the maximum number of runs. If the value of the counter is greater than the maximum number of runs, the method proceeds to step 575. Otherwise, the method proceeds to step 525.

In step 525, the method then performs a first test, wherein the first test comprises:
  (i) sending a first number of packets from a user endpoint device to a radio network controller (RNC), wherein the size of the first number of packets triggers a promotion from a second state to a third state, wherein the second state is associated with a second level of a radio resource, the third state is associated with a third level of the radio resource, wherein the second level of the radio resource is larger than a first level of the radio resource, and the third level of the radio resource is larger than the second level of the radio resource, wherein the first state is associated with a first level of the radio resource;
  (ii) receiving a first set of echoes from the RNC associated with the first number of packets;
  (iii) the user endpoint device sleeping for a number of seconds equal to the value of the counter;
  (iv) sending a second number of packets to the RNC, wherein the size of the second number of packets does not trigger a promotion from the second state to the third state;
  (v) receiving a second set of echoes from the RNC associated with the second number of packets; and
  (vi) the user endpoint device determining a first round trip transmission time for sending the second number of packets and receiving the second echoes.

In step 550, method 500 performs a second test, wherein the second test comprises:
  (i) sending a third number of packets to the RNC, wherein the size of the third number of packets triggers a promotion from the second state to the third state;
  (ii) receiving a third set of echoes from the RNC associated with the third number of packets;
  (iii) the user endpoint device sleeping for a number of seconds equal to the value of the counter;

(iv) sending a fourth number of packets to the RNC, wherein the size of the fourth number of packets triggers a promotion from the second state to the third state;

(v) receiving a fourth set of echoes from the RNC associated with the fourth number of packets; and (vi) the user endpoint device determining a second round trip transmission time for sending the fourth number of packets and receiving the fourth echoes.

In one embodiment, the first state is an IDLE state, the second state is a CELL_FACH state, and the third state is a CELL_DCH state. In one embodiment, the first number of packets is max bytes. In one embodiment, the second number of packets is min bytes. In one embodiment, the third number of packets is max bytes. In one embodiment, the fourth number of packets is max bytes.

In step 555, method 500 increments the value of the counter by one. The method then proceeds to step 520.

In step 575, method 500 determines if the difference between the first round trip transmission time and the second round trip transmission time is smaller than a predetermined length of time. For example, the difference may be less than 200 ms, 400 ms or so. If the difference between the first round trip transmission time and the second round trip transmission time is less than or equal to the predetermined length of time, the method proceeds to step 580. Otherwise, the method proceeds to step 585.

In one embodiment, the predetermined length of time is less than or equal to 500 ms.

In step 580, method 500 infers that the demotion procedure is from the third state to the second state. For example, the demotion procedure may be from CELL_DCH to CELL_FACH. For the example described above, the demotion procedures is D1: DCH→FACH. The method then either proceeds to step 595 to end processing the current inference or to return to step 510.

In step 585, method 500 infers that the demotion procedure is a demotion from the third state to the second state followed by a demotion to the first state. For example, the method may be a demotion from the CELL_DCH state to the CELL_FACH state followed by a demotion to an IDLE state. That is, the demotion procedure is D2: DCH→FACH→IDLE. The method then either proceeds to step 595 to end processing the current inference or to return to step 510.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 4 and 5 that recite a determining operation, or involve a decision, do not necessarily require that both branches of the determining operation be practiced. In other words, one of the branches of the determining operation can be deemed as an optional step.

Figure 6:
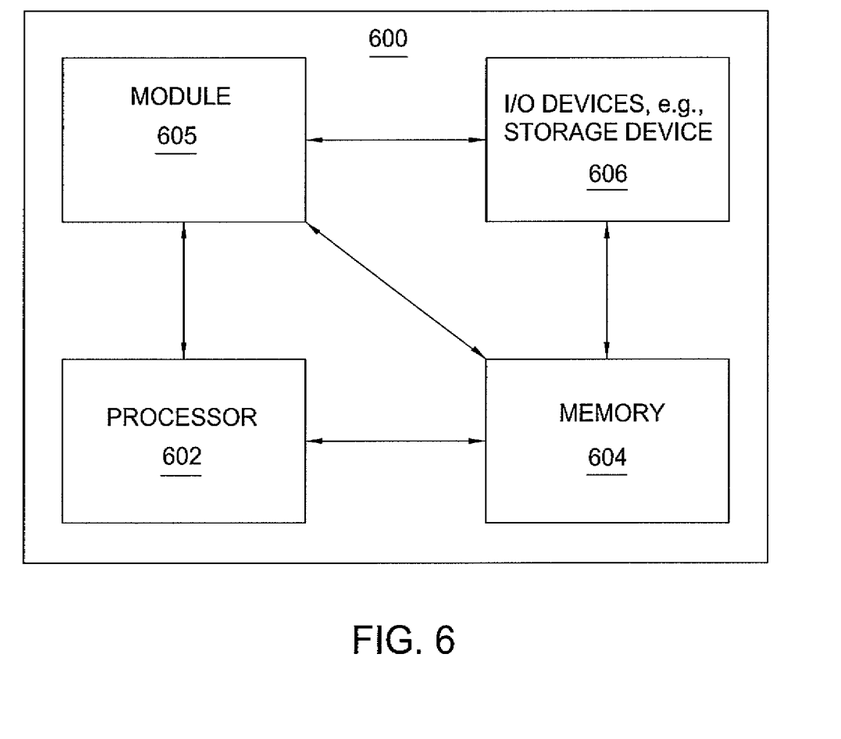
FIG. 6 illustrates a high-level block diagram of a general-purpose computer suitable for use in performing the functions described herein.

FIG. 6 depicts a high-level block diagram of a general-purpose computer readable medium suitable for use in performing the functions described herein. As depicted in FIG. 6, the system 600 comprises a processor element 602 (e.g., a CPU), a memory 604, e.g., random access memory (RAM) and/or read only memory (ROM), a module 605 for inferring a promotion or a demotion procedure of a radio resource controller state machine in a network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 605 inferring a promotion or a demotion procedure of a radio resource controller state machine in a network can be loaded into memory 604 and executed by processor 602 to implement the functions as discussed above. As such, the present method 605 inferring a promotion or a demotion procedure of a radio resource controller state machine in a network (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for inferring a state promotion procedure of a radio resource controller state machine in a network, comprising:

setting, via a processor of a user endpoint device, a radio resource control state for the user endpoint device to a first state, wherein the first state is associated with a first level of a radio resource;

sending, via the processor, a first number of packets from the user endpoint device to a radio network controller, wherein a size of the first number of packets does not trigger a promotion from a second state to a third state, wherein the second state is associated with a second level of the radio resource, wherein the third state is associated with a third level of the radio resource, wherein the second level of the radio resource is larger than the first level of the radio resource and the third level of the radio resource is larger than the second level of the radio resource;

receiving, via the processor, a first set of echoes associated with the first number of packets;

sending, via the processor, a second number of packets from the user endpoint device to the radio network controller, wherein a size of the second number of packets triggers a promotion from the second state to the third state;

receiving, via the processor, a second set of echoes associated with the second number of packets;

determining, via the processor, a round trip transmission time for sending the second number of packets and receiving the second set of echoes;

determines, via the processor, if the round trip transmission time is larger than a normal round trip transmission time between the user endpoint device and the radio network controller by a predetermined length of time;

inferring, via the processor, that the promotion procedure is a promotion from the first state to the second state and then to the third state, when the round trip transmission time is larger than the normal round trip transmission time between the user endpoint device and the radio network controller by the predetermined length of time; and inferring, via the processor, that the promotion procedure is a promotion from the first state to the third state, when the round trip transmission time is not larger than the normal round trip transmission time between the user endpoint device and the radio network controller by the predetermined length of time.

2. The method of claim 1, wherein the first state is an IDLE state.

3. The method of claim 1, wherein the second state is a CELL_FACH state.

4. The method of claim 1, wherein the third state is a CELL_DCH state.

5. The method of claim 1, wherein the first number of packets comprises approximately 28 bytes.

6. The method of claim 1, wherein the second number of packets comprises approximately 3 kilobytes.

7. The method of claim 1, wherein the predetermined length of time is at least 500 ms.

8. The method of claim 1, wherein the normal round trip transmission time comprises a single promotion delay of time.

9. The method of claim 8, wherein a second delay of time for a second is determined from the round trip transmission time and the normal round trip transmission time.

10. A method for inferring a state demotion procedure of a radio resource controller state machine in a network, comprising:
    setting, via a processor of a user endpoint device, a parameter for a number of runs to be performed;
    performing, via the processor, a first test and a second test for each of the number of runs to be performed, wherein the first test provides a first round trip transmission time, and the second test provides a second round trip transmission time,
    determining, via the processor, if a difference between the first round trip transmission time and the second round trip transmission time is smaller than a predetermined length of time;
    inferring, via the processor, that the state demotion procedure is from a third state to a second state, when the difference between the first round trip transmission time and the second round trip transmission time is smaller than the predetermined length of time; and
    inferring, via the processor, that the state demotion procedure is a demotion from the third state to the second state followed by a demotion to a first state, when the difference between the first round trip transmission time and the second round trip transmission time is not smaller than the predetermined length of time, wherein each of the first state, the second state and the third state is associated with a different level of a radio resource.

11. The method of claim 10, wherein the first test comprises:
    sending a first number of packets from the user endpoint device to a radio network controller, wherein a size of the first number of packets triggers a promotion from the second state to the third state, wherein the second state is associated with a second level of the radio resource, the third state is associated with a third level of the radio resource, wherein the second level of the radio resource is larger than a first level of the radio resource, and the third level of the radio resource is larger than the second level of the radio resource, wherein the first state is associated with a first level of the radio resource;
    receiving a first set of echoes from the radio network controller associated with the first number of packets;
    causing the user endpoint device to sleep for a number of seconds equal to a value of a counter relating to the number of runs to be performed;
    sending a second number of packets to the radio network controller, wherein a size of the second number of packets does not trigger a promotion from the second state to the third state;
    receiving a second set of echoes from the radio network controller associated with the second number of packets; and
    determining the first round trip transmission time for sending the second number of packets and receiving the second set of echoes.

12. The method of claim 11, wherein the second test comprises:
    sending a third number of packets to the radio network controller, wherein a size of the third number of packets triggers a promotion from the second state to the third state;
    receiving a third set of echoes from the radio network controller associated with the third number of packets;
    causing the user endpoint device to sleep for a number of seconds equal to the value of the counter;
    sending a fourth number of packets to the radio network controller, wherein a size of the fourth number of packets triggers a promotion from the second state to the third state;
    receiving a fourth set of echoes from the radio network controller associated with the fourth number of packets; and
    determining the second round trip transmission time for sending the fourth number of packets and receiving the fourth set of echoes.

13. The method of claim 12, wherein the third number of packets comprises approximately 3 kilobytes, and wherein the fourth number of packets comprises approximately 3 kilobytes.

14. The method of claim 11, wherein the first number of packets comprises approximately 3 kilobytes, and wherein the second number of packets comprises approximately 28 bytes.

15. The method of claim 10, wherein the first state is an IDLE state.

16. The method of claim 10, wherein the second state is a $CELL_{13}$ FACH state.

17. The method of claim 10, wherein the third state is a CELL_DCH state.

18. The method of claim 10, wherein the predetermined length of time is less than or equal to 500 ms.

19. The method of claim 10, wherein an inactivity timer for the demotion from the third state to the second state is determined from the first round trip transmission time and the second round trip transmission time.

20. The method of claim 10, wherein an inactivity timer for the demotion from the second state to the first state is determined from the first round trip transmission time and the second round trip transmission time.

* * * * *